Figure 5:
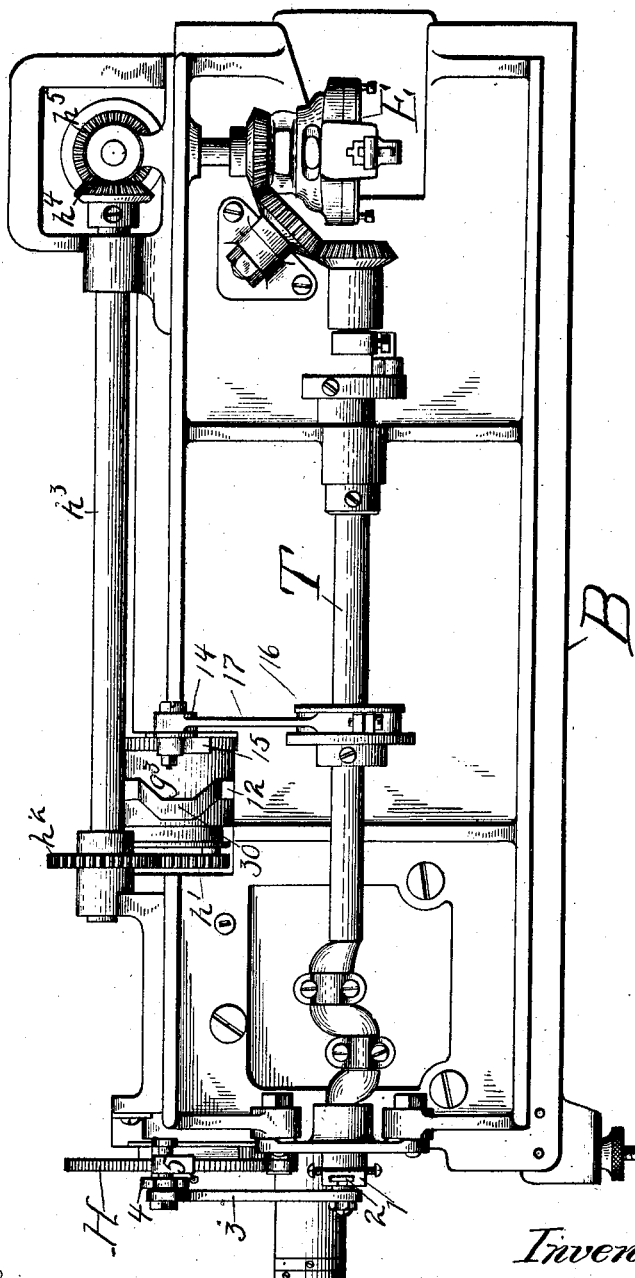

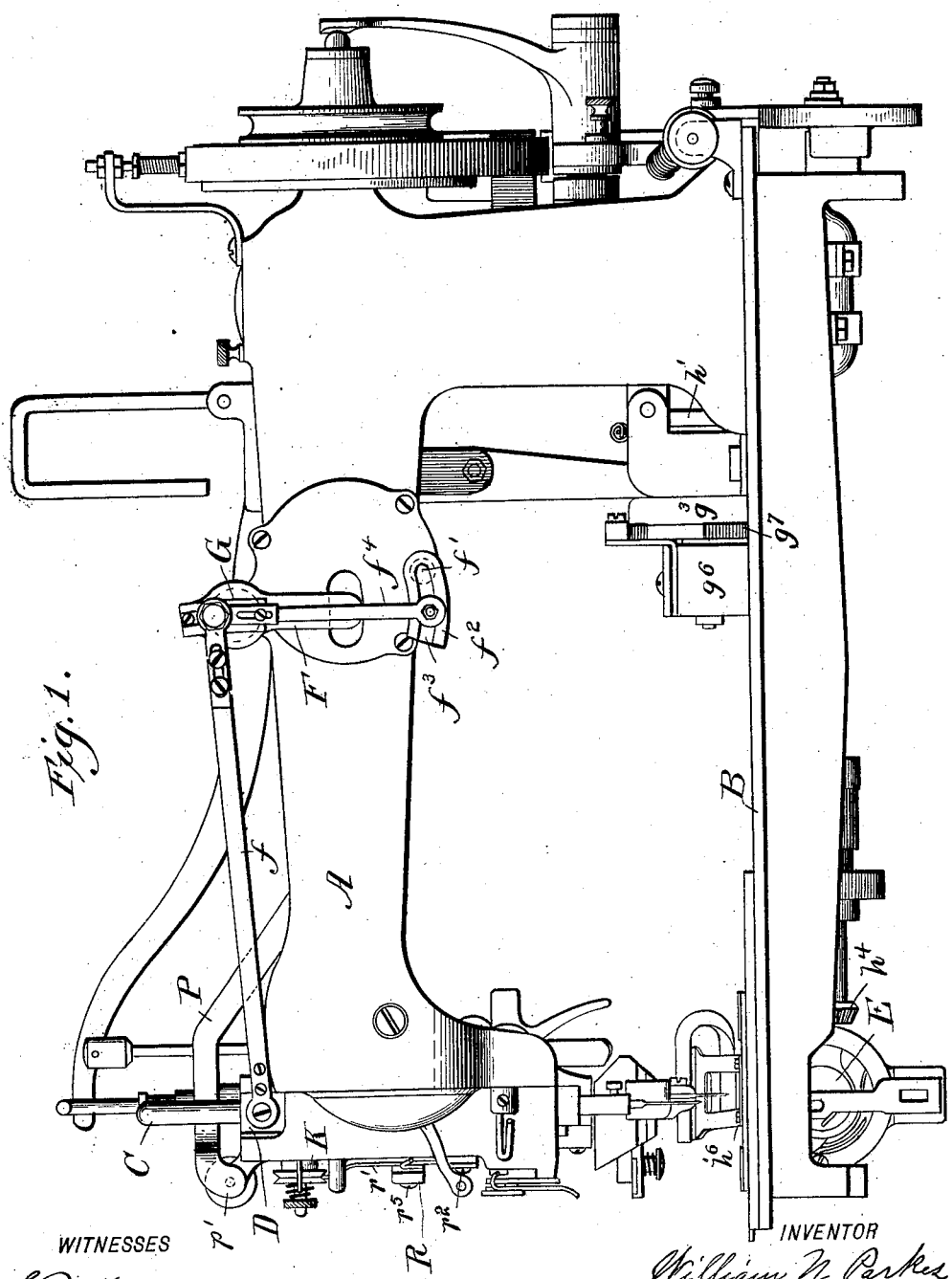

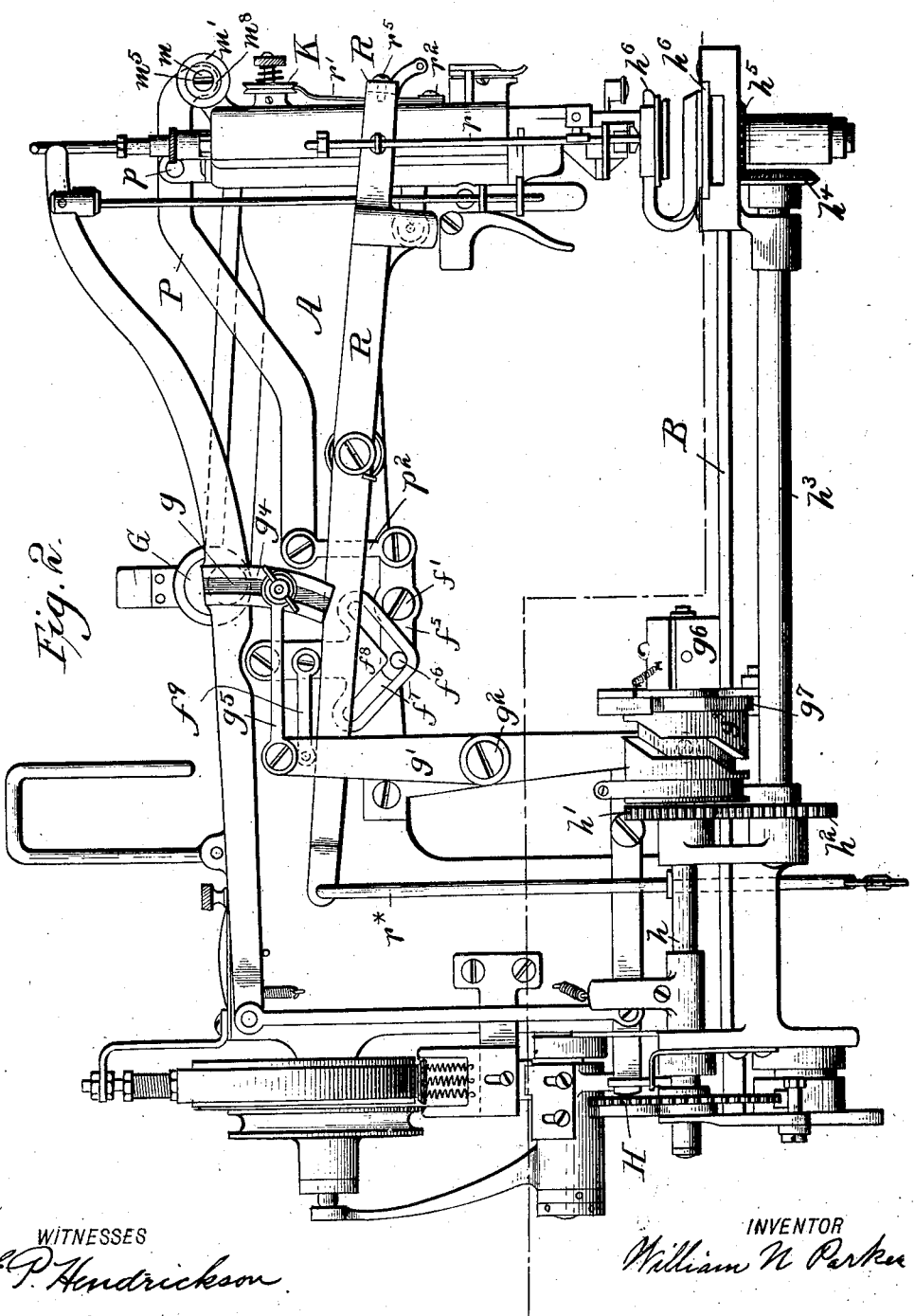

No. 875,597. PATENTED DEC. 31, 1907.
W. N. PARKES.
THREAD CONTROLLING MECHANISM FOR SEWING MACHINES.
APPLICATION FILED OCT. 10, 1899.
6 SHEETS—SHEET 3.
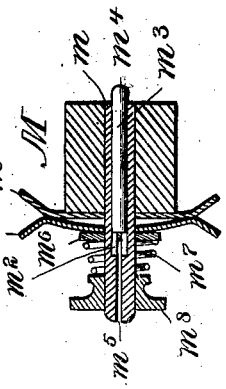
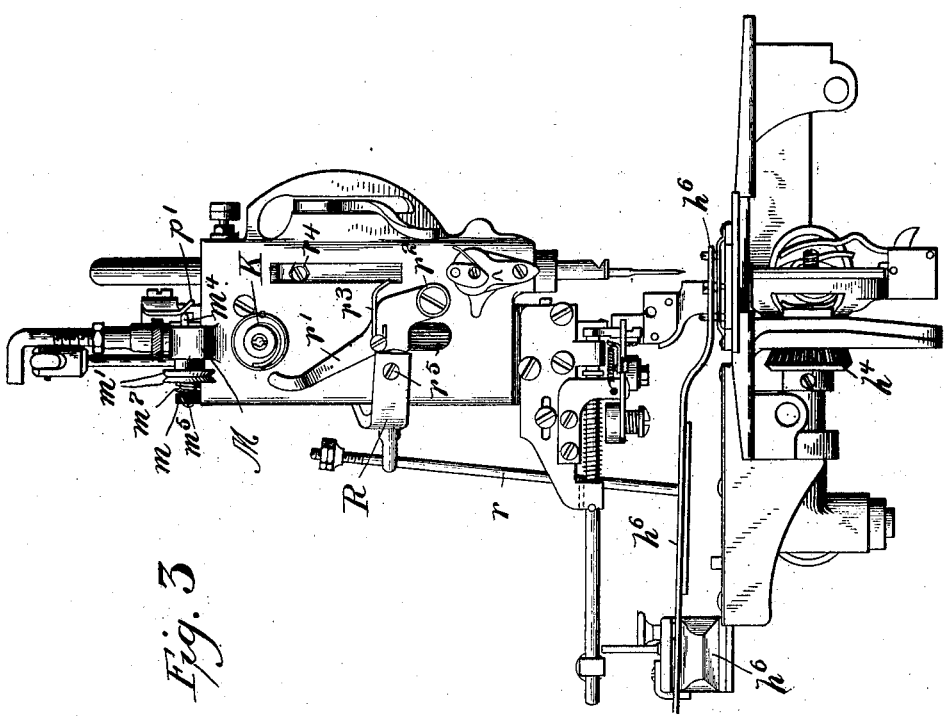
WITNESSES
INVENTOR
William N. Parkes No. 875,597. PATENTED DEC. 31, 1907.
W. N. PARKES.
THREAD CONTROLLING MECHANISM FOR SEWING MACHINES.
APPLICATION FILED OCT. 10, 1899.

6 SHEETS—SHEET 4.

Witnesses:
J. B. McGirr.
R. C. Boswell.

Inventor.
William N. Parkes.

No. 875,597. PATENTED DEC. 31, 1907.
W. N. PARKES.
THREAD CONTROLLING MECHANISM FOR SEWING MACHINES.
APPLICATION FILED OCT. 10, 1899.

6 SHEETS—SHEET 5.

Witnesses:
J. B. McGirr.
R. C. Boswell.

Inventor:
William W. Parkes

No. 875,597. PATENTED DEC. 31, 1907.
W. N. PARKES.
THREAD CONTROLLING MECHANISM FOR SEWING MACHINES.
APPLICATION FILED OCT. 10, 1899.
6 SHEETS—SHEET 6.
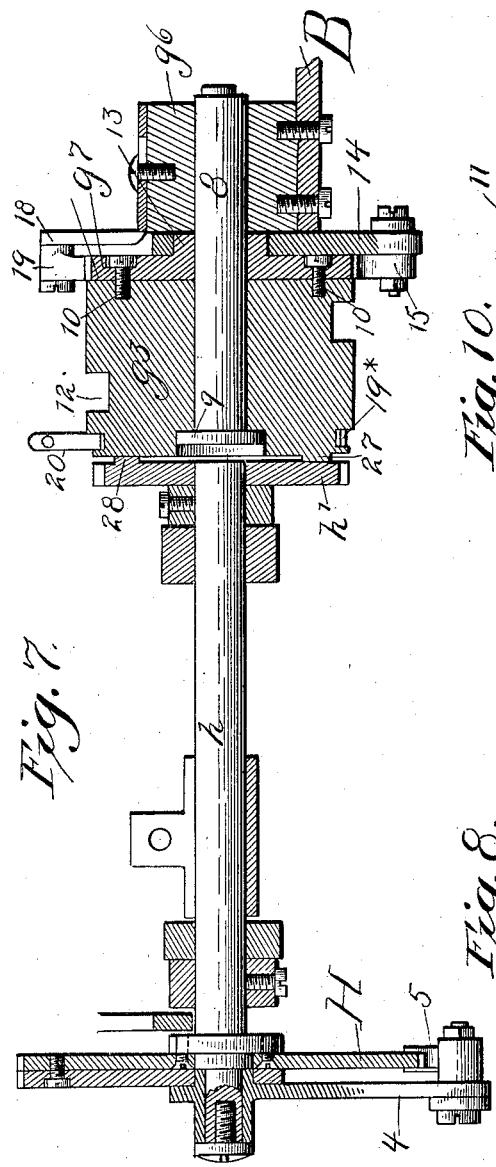
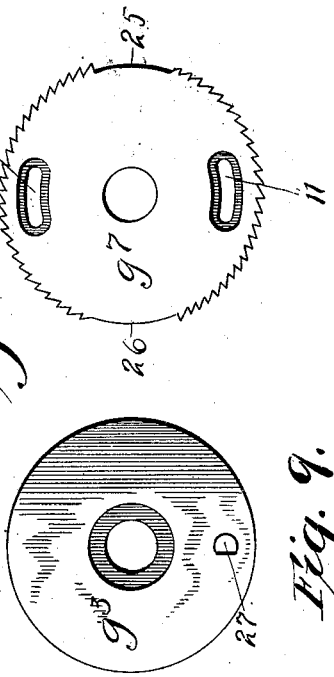
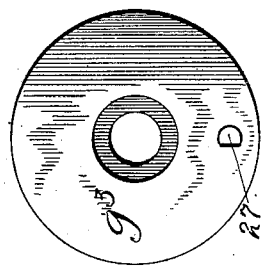
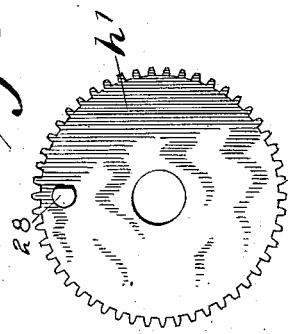
Witnesses:
J. B. McGinn.
R. C. Boswell.
Inventor:
William N. Parkes.

UNITED STATES PATENT OFFICE.

WILLIAM N. PARKES, OF NEW YORK, N. Y.

THREAD-CONTROLLING MECHANISM FOR SEWING-MACHINES.

No. 875,597. Specification of Letters Patent. Patented Dec. 31, 1907.

Original application filed September 12, 1898, Serial No. 690,777. Divided and this application filed October 10, 1899. Serial No. 733,225.

*To all whom it may concern:*

Be it known that I, WILLIAM N. PARKES, a citizen of the United States of America, residing at New York, borough of Brooklyn, in the county of Kings and State of New York, have invented certain new and useful Improvements in Thread-Controlling Mechanism for Sewing-Machines, of which the following is a specification.

On September 12th, 1898, I filed an application, Serial No. 690,777 for a patent on a button hole sewing machine, and on September 25, 1900, U. S. Patent No. 658,578 was granted to me on the same. My present application is a division from said former application. In my said machine as shown in said patent, and in my present application the work is moved in a right line only to dispose the stitches longitudinally of the buttonhole, the needle is moved laterally one extent for the stitches at the sides of said hole, and a different extent for the stitches at the ends thereof, and the working position of the needle is changed laterally to make stitches from one to the other side of said buttonhole.

The mechanism for changing the extent of the lateral movement of the needle for the end stitches, and for changing the working position of the needle from one to the other side of the hole, is operated from the movement of a single ratchet wheel, and the mechanism for moving the work to dispose the stitches longitudinally of the hole is operated from the movement of a single ratchet wheel, and these wheels are mounted and operated separately from each other. Means are provided intermediate said wheels whereby the first wheel is caused to go into action from the movement of a part of the mechanism operated by the second wheel, and the said first ratchet and the mechanism operated by it, goes out of action simultaneously with the beginning of the side stitches of the hole.

For clearness in this application the first mentioned ratchet wheel and the mechanism operated by it will be called the needle and stitch change mechanism, and the second ratchet wheel, and the mechanism operated by it will be called the work moving or feeding mechanism. The function of the said needle and stitch change mechanism is threefold. Through its actions the extent of the lateral movement of the needle is positively and rapidly increased from the side stitches to the end stitches, and rapidly and positively decreased from the end stitches to the side stitches. And simultaneously with the change from the side stitches to the end stitches the working position of the needle is positively shifted to a central position at the end of the hole, and after the stitching at the end is completed, the working position of the needle is again positively shifted to a side stitching position. It is thus seen that the function of increasing and decreasing the extent of the lateral movement of the needle, and the function of shifting laterally the working position of the needle is performed by this mechanism. The third function performed by this mechanism is that of operating positively a device for changing the tension on the thread, and this mechanism adapted to perform said third function is the subject matter of my present application.

In my said present application the parts that act to change the tension on the thread will be called the tension change parts or mechanism. The stitches positioned through the action of the needle and stitch change mechanism will be called the end stitches of the button-hole, and the other stitches will be called the side stitches. In connection with this definition it is noted that the needle and stitch change mechanism only acts at the ends of the button-hole.

In the machine shown and described in my said former patent and my present application, the stitches at one end of the buttonhole are made during one half of a cycle of movement of the needle and stitch change mechanism, and the stitches at the other end of said button-hole are made during the other half of the cycle of movement of said mechanism. During the stitching of the sides of the button-hole none of the cycle of movement of said needle and stitch change mechanism is used, so it will be understood that the use of this mechanism is kept intact for its special purposes or objects, and one of these objects is as before stated to operate a tension change device.

The tension change device herein shown and described is actuated positively in both directions, the tension is reduced by positive moving means, and is restored by positive moving means, and as before noted said means is actuated separately from the feeding mechanism, and several times as fast as said mechanism.

In addition to other objects it is noted that it is an object of this invention to provide means operated separately from the feeding mechanism for changing the tension on the thread, and to suspend the action of said means during the stitching of the sides of the hole.

Figure 6:
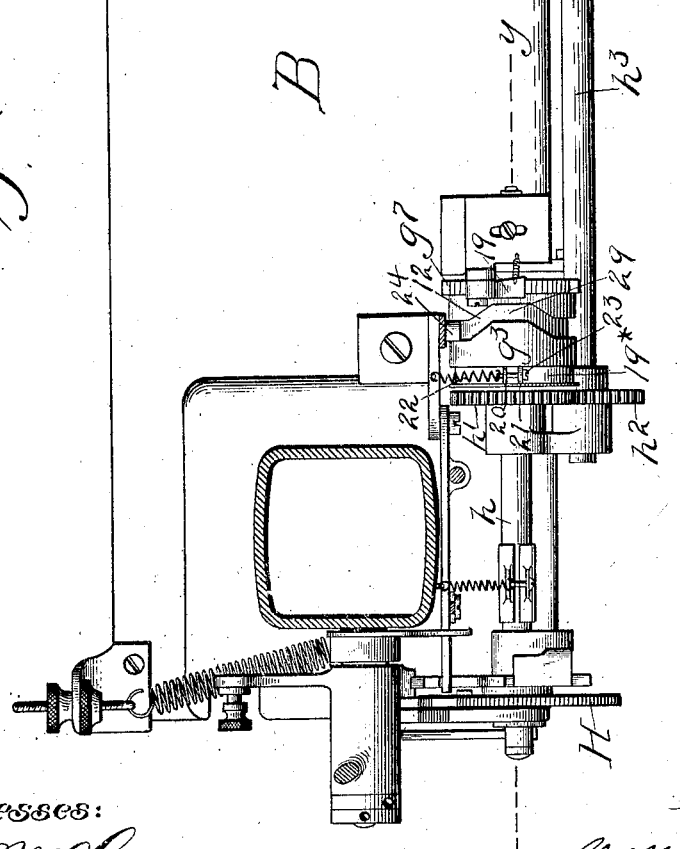

The nature and further objects of my invention will be best understood when described in connection with the accompanying drawing in which Figure 1 is a front view of a button hole sewing machine embodying my invention, Fig. 2 a rear view and Fig. 3 an end view of the same, Fig. 4 is a detail sectional view on an enlarged scale of one of the tensions. Fig. 5 is a bottom plan view of the machine. Fig. 6 is a sectional view on line $x-x$ Fig. 2. Fig. 7 is a section on line $y-y$ Fig. 6. Fig. 8, 9 and 10 are details of the operating mechanism.

Similar letters of reference designate corresponding parts throughout the several views of the drawings.

The letter A designates the arm of the machine, B the bed-plate, C the needle bar, D the gate in which the needle bar is mounted, E the understitching mechanism, T the lower shaft of the machine, all of which are of the usual construction in sewing machines which have a laterally vibrating needle.

I will now describe the mechanism for operating the work support and for feeding the work longitudinal of the button hole.

In suitable bearings at the rear end of the machine is mounted to turn a shaft $h$ to the rear end of which is attached a ratchet wheel H. To the rear end of a shaft T is attached an arm 1 which has a T shaped groove 2 formed in it, in which one end of a link 3 is connected, the other end of the said link being connected to a pawl lever 4 which carries the pawl 5 at its outer end, the said pawl being adapted to engage the ratchet wheel H. To the forward end of the shaft $h$ is attached a gear wheel $h'$ which meshes with a gear wheel $h^2$ mounted on the rear end of a shaft $h^3$, the said shaft being suitably mounted in bearings connected to the bed-plate of the machine. To the forward end of the shaft $h^3$ is attached a bevel gear $h^4$ which meshes with a bevel gear $h^5$ suitably mounted to turn in a horizontal plane. A disk 6 is connected to the upper side of the bevel gear $h^5$ and turns with the gear in a horizontal plane. To the top of the said disk is attached a cam 7 which is adapted to be adjusted toward and from the center of the disk 6 which disk is central with respect to the axis of the gear wheel $h^5$. A work support which I generally designate by the reference character $h^6$ is mounted in suitable bearings and confined thereby so as to reciprocate in a right line and move the work across the path of the needle. On the under side of the work support suitable bearings (not shown) are provided for engagement with the cam 7.

The above described means serve the purpose of feeding the work support and through it the work longitudinal of the button hole. The cam 7 is so constructed that it gives the said work support a uniformly progressive movement. The adjustment of the said cam to and from the center of the disk 6 determines the length of the button hole and the adjustment of the extent of the stroke of the pawl lever 4 and through it the pawl 5 determines the number of stitches that will be made along the sides of the button hole.

I will now describe the means which I preferably provide for producing the relative jogging movement necessary in the stitching of button holes. This mechanism consists of two parts or divisions; one gives the jogging movement to the needle and the other controls the said jogging movement and changes it for the stitching or barring at the ends of the button hole.

In a suitable bearing on the arm A of the machine, and transversely with respect to the same is mounted a shaft $g$ to the forward end of which is attached an eccentric G. The upper end of a lever F is pivoted on the said eccentric, and the lower end of the said lever F is in engagement by means of an ordinary cam follower with a usual switch cam (not shown) attached to the upper shaft (not shown) of the machine. A link $f$ is at one end connected in a guide way formed in the upper end of the lever F, the said guide way extending from the axis of the eccentric G upwardly and the end of the said link being adapted to slide in the same. The link $f$ is at its other end attached to the needle bar gate D.

Assuming now that the eccentric G is held from turning, and the end of the link $f$ from changing in the guide-way formed in the lever F, it is evident that the lateral movement of the lever F will transmit a lateral movement of a uniform extent to the needle-bar gate, and through it to the needle-bar and needle.

I will now describe my needle, and stitch change mechanism, by means of which the extent of the lateral movement of the needle is increased for the end stitches and decreased for the side stitches and the working position of the needle shifted laterally for the end stitches, and after said end stitches have been made, again shifted laterally to a position for making side stitches.

A bearing $g^6$ is detachably connected to the bed-plate B of the machine. In the said bearing is fixed one end of a stud shaft 8 having formed at its rear end a flange 9. On the front end of the said stud shaft and next to the bearing $g^6$, is mounted to turn a ratchet wheel $g^7$. Next to the said ratchet wheel and adjustably connected to it by means of screws 10 and slots 11 is mounted the cam $g^3$ which has a groove 12 formed in its periphery. The flange 9 serves to keep these elements in their proper position on the shaft S. On a bearing 13 formed on the ratchet wheel $g^7$ is pivoted a pawl lever 14 which carries a pawl 15 adapted to engage the teeth of the ratchet wheel $g^7$. (See Fig. 7.)

On the lower shaft T is secured an eccentric 16 which is encircled by a yoke or strap formed in one end of a link 17. The other end of the said link is connected to the outer end of the pawl lever 14. This means serves to operate the pawl 15 and through it the cam $g^3$ and its concomitant parts. On the upper end of a bracket 18 which is secured to the bearing $g^6$ is mounted a stop pawl 19 which is adapted to engage the teeth of the wheel $g^7$ and prevent retrograde movement of the same.

The following means serve to control the ratchet wheel $g^7$ and thereby prevent undesirable movements in the same and in the mechanism operated by it. In a suitable groove of cam $g^3$ is a friction strap 19*, the body of the said strap encircling the cam $g^3$ in the said groove and having extensions 20 and 21 Fig. 6 projecting outwardly. Suitable friction material is inserted between the said strap and the said cam to produce a frictional contact between them. A spring 22 is attached at one end to a fixed pin and at the other end to the extension 20 of the strap 19*, the tension of the spring being such that it draws on the strap in a direction opposite to the forward movement of the ratchet wheel $g^7$. A screw 23 passes freely through the extension 21 and has its seat in the extension 20, and serves as a means for regulating the degree of friction between the strap and the cam. The spring 22 and the strap which it acts upon serve as a means for keeping the teeth of the ratchet wheel $g^7$ always in engagement with the stop pawl 19, so that the cam $g^3$ is always in its proper position whether at rest or in action.

A lever $g'$ suitably pivoted at $g^2$ is (at its lower end by means of a friction roller 24 which is attached thereto) in engagement with the cam groove 12 of the cam $g^3$. One end of a link $g^5$ is connected to the other end of the said lever $g'$, and the forward end of the said link $g^5$ is adjustably held in a grooved way formed in a lever $g^4$ which latter is attached to the rear end of the shaft $g$ as shown in Fig. 2. A lever $f^8$ is suitably pivoted on the arm A and has a cam groove $f^7$ formed in its lower end. A link $f^a$ connects the said lever $f^8$ to the lever $g'$ as also shown in Fig. 2. In a suitable bearing attached to the arm of the machine and transversely to the same is a shaft $f''$ which has a lever $f^5$ attached to its rear end, the said lever being in engagement with the cam groove $f^7$ by means of an anti-friction roller $f^6$. To the forward end of the shaft $f''$ is attached an arm $f^2$ which has a way $f^3$ formed in its face. The lower end of a link $f^4$ is adjustably held in the way $f^3$ and the upper end of the said link is connected to the link $f$, and adapted to reciprocate the same in the way formed in the upper end of the lever F.

In the periphery of the ratchet wheel $g^7$ between the teeth are formed gaps 25 and 26, the slots 11 being formed therein for the purpose of adjusting these gaps relative to the cam groove 12 of the cam $g^3$. On the rear end of the cam $g^3$ next to the gear wheel $h^1$ is a tappet 27 and on the side of the said gear wheel $h^1$ is a tappet 28 adapted to engage the tappet 27. The gaps 25 and 26 serve as means for disengaging the pawl 15 from the teeth of the ratchet wheel $g^7$ and thereby arresting the movements of the said wheel and the mechanism operated by it, the said tappets serve as means for bringing about a reëngagement of the pawl 15 with the teeth of the ratchet wheel $g^7$.

The link $f^4$ which connects the arm $f^2$ with the end of the link $f$, is made in two parts as will be seen in Fig. 1, and these parts are adjustable relative to each other, so that the link $f^4$ which comprises them may be made longer or shorter. If it is desired to increase the normal lateral movement of the needle, these parts are adjusted so as to increase the length of the link $f^4$, and thereby normally hold the end of the link $f$ further from the axis of the pivot of the lever F. And this of course causes the said lever to transmit a movement of a greater extent to the connection $f$, and through the same a greater lateral movement to the needle-bar gate, the needle-bar, and the needle.

Having now described my needle and stitch change mechanism, the operation of the same will be briefly noted.

During the stitching of the sides of a button-hole the end of the link $f$ is held a uniform distance from the axis of the pivot of the lever F, and the needle is thereby moved laterally a uniform distance.

In practice at the beginning of the stitching of the first end of a button-hole a few stitches are made across said end, then the first side of the hole is stitched, then all the stitches are completed at the other end of the hole, then the second side of the hole is stitched and finally the hole is finished by again making end stitches at the beginning end of the hole, and on top of the stitches previously made. But for the purpose of explaining the workings of this mechanism let it be assumed that the same is operated and stitching along the first side of the hole. When this is being done the actuating pawl 15 is beating time in, say gap 25 of the ratchet wheel $g^7$, and said wheel is therefore at rest, the needle is being moved laterally the proper extent for the stitches along the sides of the hole, and the work is being moved longitudinally of the hole from the movement of the feed wheel H. Simultaneously with the lateral movement of the needle previous to the last stitch at the end of the first side of the hole, the tappet 28 engages the tappet 27 and moves the same so that the first tooth of the ratchet wheel $g^7$ across the gap 25, comes under the end of the path of the actuating pawl 15. (This movement of the ratchet $g^7$ is only the extent of one of the teeth of the same, and the cam and parts operated from the movement of this wheel are so constructed that this movement does not affect them at all.) Simultaneously with the next lateral movement of the needle the actuating pawl 15 moves the ratchet wheel $g^7$ forward the extent of one stroke of the said pawl. This movement of the said ratchet wheel turns the cam $g^3$, and through its action and the mechanism operated by it, the eccentric G is turned to move the working position of the needle towards the center of the button-hole. Simultaneously with this movement of said eccentric the arm $f^2$ is moved, and through it the end of the connection $f$ is moved further from the pivot of the lever F, and at the same time the said lever F is turned on its pivot by the usual switch cam that operates it, in the opposite direction to that in which the eccentric turns. The turning of the eccentric in the opposite direction to that in which the lever F turns prevents the increase in the lateral movement of the needle which would have taken place by reason of the movement of the end of the link $f$ away from the pivot of said lever F. Simultaneously with the next movement of the lever F on its pivot the cam $g^3$ again acts, and the end of the connection $f$ is moved again away from the pivot of said lever F, and simultaneously with this movement of said lever the eccentric G is again turned on its axis to move the working position of the needle towards the center of the button-hole, and this movement this time being in the same direction in which the needle moves the latter is carried completely across the end of the button-hole, and the first stitch across the same is thereby made without any intermediate bastard stitches. The cam groove in the cam $g^3$ is so constructed that the parts are now held in this position until the desired number of stitches have been made across the end of the button-hole, when said cam again actuates the parts and the needle is brought in a position for making the first stitch on the other side of the button-hole, without any intermediate bastard stitches being made.

In making the foregoing movements the lever $g^1$ is turned on its pivot in one direction only, first to the position where the first stitch is made across the end of the button-hole. In reaching this position the lever $f^8$ is moved from one of its extreme lateral positions to its central position as shown in Fig. 2. In reaching this position the said lever $f^5$ is turned on its pivot, which is the shaft $f^1$, and this movement of said lever turns said shaft, and through it the arm $f^2$, the connection $f^4$ and the end of the connection $f$, a sufficient extent to increase the amplitude of the lateral movement of the needle for the making of the end stitches across the end of the button-hole. After the end stitches have been completed the lever $g^1$ moves again in the same direction as before, and this movement brings the lever $f^8$ to its extreme lateral position in the direction it moved before, and when in this position the roller $f^6$ is in an extreme end of the cam slot $f^7$ of the said lever $f^8$.

It will now be understood that in moving the part to change from the side stitches to the end stitches, and back again to the side stitches, the lever $f^8$ moves from one of its extreme lateral positions to the other, and that in making this movement the cam groove $f^7$ in said lever causes the lever $f^5$ to turn in one direction, and then back again. The function of this lever and the cam groove in it is two fold. By its movement the lateral movement of the needle is positively increased and decreased, and simultaneously with said increase and decrease, the tension change device is operated to decrease, and increase the tension on the thread. And the function of the cam $g^3$ and the lever $g^1$ is also two fold. By the movement of the said cam the said lever $g^1$ is operated, and by the movement of the same the eccentric G is turned, and the working position of the upper end of the lever F thereby moved laterally, and through the connection between the same and the needle the latter is moved laterally. And in performing this function the said lever $g^1$ also moves the lever $f^8$ laterally, and thereby increase and decrease the tension on the thread simultaneously with the lateral shift in the working position of the needle.

Having now explained the workings of the mechanism which operates my tension change device, to an extent that it is thought necessary for an understanding of the same, I will now specify the construction of said tension change device, and the connection between the same and the said mechanism.

On the face of the machine is an ordinary tension which I designate as K and which is adjusted or regulated in a usual manner. This tension forms no part of this invention except its use with other parts of the tension device. In a suitable location on the face of the machine a second tension device is affixed which is composed of the following elements.

In a bearing M on the face of the machine is located a stud $m$ which stud runs entirely through said bearing. The outer end of this stud is adapted to carry the tension disks $m'$ which are mounted on the outside of the stud by means of a hole formed centrally through the said disks. A hole $m^2$ is formed nearly through the center of the stud $m$. In the said hole a releasing rod $m^3$, having an extending end $m^4$, loosely fits. A slot $m^5$ is made through the forward end of the stud and extends into the hole $m^2$. Next to the tension disks on the stud is mounted a releasing plate $m^6$ which has a portion extending through the slot $m^5$ in the stud $m$. On the stud next to the releasing plate is a tension spring $m^7$. The outer end of the stud $m$ is threaded and on the portion next to the tension spring is a thumb nut $m^8$ which is adapted for manually regulating the tension. It is now seen that if the rod $m^4$ is pushed in, it will engage with the releasing plate $m^6$ (by reason of its coming into contact with the portion of the said plate which passes through the slot $m^5$ and the hole $m^2$) and release the tension disks from the pressure of the spring $m^7$ and thereby remove the tension from the thread which passes between these disks.

This tension device is of an ordinary construction which is used in machines in which the tension is released from the thread when the presser foot is lifted, to avoid the breaking of the thread or the needle by the operator in removing the work. It is of course obvious that this or any other suitable tension device may be used in combination with my invention.

The following means are provided for automatically engaging the end $m^4$ of the releasing rod and thereby releasing the tension.

A lever P is pivoted at $p$ and has a cam $p'$ formed on its forward end which is adapted to engage the end $m^4$ of the releasing rod $m^3$. A link $p^2$ connects the rear end of the lever P with the forward end of the lever $f^5$. When the forward end of the lever $f^5$ is raised the forward end of the lever P is lowered and the cam $p'$ formed thereon is brought into engagement with the end $m^4$ of the releasing rod $m^3$.

In the operation of this tension change device, the tension K is regulated to produce the desired tension for the end stitches, and the tension, which is called a second tension in the specification, is regulated so as to produce the additional tension desired on the thread during the making of the stitches along the side of the hole.

As the lever $g^1$ moves from one of its positions to the position shown in Fig. 2, the cam lever $f^8$ is moved from one of its lateral positions to the position in which it is shown in said figure, and in moving to this position the said lever $f^8$ turns the lever $f^5$ on its pivot. This movement of the lever $f^5$ pushes the connection $p^2$ upwardly and this causes the cam or incline $p^1$ formed on the forward end of said lever to engage the plunger $m^4$, and thereby release all the tension produced on the thread from the second tension device. At the time this action takes place the parts have reached the position shown in said Fig. 2, and they remain in this position until the end stitches at one end of the button-hole have been completed. After the said end stitches have been completed, the lever $g^1$ is moved in the same direction it moved before to one of its extreme lateral positions, and this movement of said lever moves the cam lever $f^8$ in the same direction it moved before to one of its extreme lateral positions, and through this movement the cam $f^7$ is caused to act, and the lever P is moved in the opposite direction to that in which it moved before. And this movement of the lever P disengages its end $p^1$ from the second tension device, and the tension of the same is thereby restored to the thread.

It is to be noted that the movement of the lever $g^1$ from one of its extreme lateral positions to the other automatically and positively increase and decrease through the parts $f^9, f^8, f^5, f^1, f^2$ and $f^4$, the extent of the lateral movement of the needle, and that simultaneously with these changes the working position of the needle is changed laterally as before explained, and also simultaneously with these movements the tension on the thread is decreased and increased, and all from the movement of said lever $g^1$ from one of its extreme lateral positions to the other.

In button-hole machines it is desirable to have all the tension on the needle thread removed from the same at the finishing of a button-hole, so that the work may be readily removed without breaking the said thread or needle. It is obvious that if there is a strong tension on the thread when the work is moved, and the thread thereby drawn through the tension, there is a liability of the thread breaking, and also by reason of the lateral movement of the work, a liability of the needle being drawn to one side and thereby broken.

One of the objects of applicant's device as a whole is, to so construct it that all the tension will be removed from the thread when the work-clamp is opened for the purpose of manually moving the work. The means for accomplishing this object will now be described.

The stop motion device in my present machine, and described in my aforesaid patent of record from which my present application was divided, as before noted, is caused to act at the time the parts are in position of stitching the finishing end of the button-hole. And at the time the finishing end of the hole is completed the cycle of a movement of the needle and stitch change mechanism is not completed therefore, the tension of the aforesaid second tension device is disengaged from the thread at the time the button-hole is completed. It is thus evident that to remove the balance of the tension on the thread it is only necessary to release the tension produced on the same by the tension device designated by K. This tension is removed from the thread by the following means.

A lever R is suitably pivoted on the arm of the machine as shown in Fig. 2, and this lever may be operated in any usual manner, by means of for example a connection $r^*$, the upper end of which is connected to the rear end of said lever R, may be in any suitable manner connected at its other end to a usual foot lever. A connection $r$, connects the forward end of said lever R to the upper member of the work clamp as seen in Fig. 3, and by this means the clamp may be opened when the lever R is operated.

A tension release lever $r^1$ is pivoted at $r^2$ on the face of the machine, and has a spring $r^3$ attached to it which crosses the path of an extending stud $r^4$, which is attached to the needle-bar in a usual manner. The outer end of the lever R is bent around so that a portion of it extends parallel to the face of the machine. Through this portion of the said lever a screw $r^5$ passes and has an extending end (not shown) on the inner side of the lever R which is adapted to engage the lever $r^1$. The upper end of the lever $r^1$ is made wedge shaped, in a usual manner, and adapted to enter between the tension disks of the tension device K, and release the same from the thread.

At the completion of a button-hole the operator operates the lever R, by usual means that is connected to the lower end of the rod $r^*$, to open the work-clamp for changing or removing the work. This movement of said lever causes the projecting end of the screw $r^5$ to come into engagement with the lever $r^1$, and forces the wedge shaped end of the same between the tension disks of the tension device K and thereby release the tension of the same from the thread. When the operator releases the lever R, after the said action, the said lever is returned by a spring in a usual manner to its normal position which is as shown in Fig. 3. This movement of said lever permits the work-clamp to close, and also permits the lever $r^1$ to return to its normal position. The lever $r^1$ remains between the disks of the tension K until the machine is started, when the descent of the needle-bar brings the stud $r^4$ into engagement with the spring $r^3$, and the said tension is thereby returned to its normal position. It is thus understood that the tension is removed from the thread after the completion of a hole, and remains removed from the same until the parts are in position to commence another button-hole, and the needle commences to descend to make the first stitch of the same.

The mechanism which I have described is a preferred form of my invention, and it is to be noted that I do not wish to be confined to this particular form, as it is evident that many changes might be made in the same without departing from the spirit of my invention.

The term tension device used in the claims is to be understood to include within its scope any means for producing a tension on the thread, whether that means consists of a single part arranged to produce a tension on the thread, or of a plurality of parts acting at one place on the thread, or a plurality of places or points on the thread to produce a tension on the same.

What I claim as new is:—

1. A button-hole machine comprising means for making the end and side stitches of a button-hole, a work moving mechanism, and means actuated separately from the said work moving mechanism for producing a tension on the thread of one extent during the making of said end stitches, and of a different extent during the making of said side stitches.

2. A button-hole machine comprising means for making the end and side stitches of a button-hole, a device for producing a tension on the thread during the making of said stitches, a work moving mechanism, and means actuated separately from the said work moving mechanism for engaging said device and thereby changing the degree of tension produced on the thread by the same.

3. A button-hole machine comprising means for making the end and side stitches of a button-hole, a tension device for the thread, a tension change device for engaging said tension device, mechanism for actuating said tension change device, and means for suspending the action of said mechanism during the making of the side stitches of said button-hole.

4. A button-hole machine comprising a tension device for the thread, a revolving part, means intermediate said revolving part and said tension device whereby the degree of tension produced on the thread by the same is changed from the movement of said revolving part, and means for suspending the action of said revolving part during the stitching of a predetermined part of a button-hole.

5. In a button-hole machine, a tension device for the thread, a ratchet wheel, an actuating pawl adapted to operate the said ratchet wheel, said pawl being normally out of engagement with the teeth of the said ratchet wheel, means for turning at certain intervals, the teeth of the ratchet wheel into engagement with the said actuating pawl.

and means operated through the movement of the ratchet wheel adapted to vary the degree of tension produced on the thread by the aforesaid tension device.

6. In combination in a button-hole sewing machine, a stitch forming mechanism, a feeding mechanism for the work, a tension device for the thread, a cam, a connection between the said cam and the tension device, a ratchet wheel for actuating the cam, an actuating pawl normally out of engagement with the teeth of the ratchet wheel, and means for bringing the teeth of the ratchet wheel into engagement with the said pawl.

7. In a button-hole sewing machine, a stitch forming mechanism, a feeding mechanism, a tension device for the thread, a mutilated ratchet wheel, a pawl, means for bringing the teeth of the ratchet wheel into engagement with the pawl, means separate from the feeding mechanism for operating the said pawl, and means intermediate the ratchet wheel and the tension device whereby when the ratchet is operated the degree of tension on the thread is varied.

8. In combination in a button-hole sewing machine, stitch forming mechanism, feeding mechanism comprising an intermittingly rotating feed wheel, a tension device for the thread, a ratchet wheel, a vibrating pawl normally out of engagement with the teeth of the ratchet wheel, means intermediate the aforesaid feed wheel and the ratchet wheel whereby the vibrating pawl is brought into engagement with the teeth of the ratchet wheel, and means intermediate the said ratchet wheel and the tension device whereby the tension on the thread is increased and decreased.

9. In combination in a button-hole machine, a work moving mechanism, a needle and stitch change mechanism that is actuated separately from said work moving mechanism, a tension device for the thread, a tension change device adapted to engage said tension device, and means adapting said needle and stitch change mechanism to operate said tension change device.

10. In combination in a button-hole machine, means for making the end and side stitches of a button-hole comprising a reciprocating and laterally moving needle, mechanism for shifting laterally the working position of said needle from one to the other side of a button-hole, a tension device for the thread, a tension change device adapted to engage said tension device, and means adapting said mechanism to operate said tension change device.

11. A button-hole machine comprising a tension device for the thread, a needle and stitch change mechanism, a lever, an actuating cam adapted to operate said lever, and means connected to said lever whereby during the movement of the same in one direction the needle and stitch change mechanism is operated the tension device engaged and the tension on the thread thereby decreased and increased.

12. In combination in a button-hole machine, means for making the end and side stitches of a button-hole, a tension device, a tension change device, a pivoted lever in which a cam groove is formed, a connection between said cam groove and said tension change device, and means for actuating said lever, so that said tension change device is actuated to reduce and increase the tension produced on the thread by the tension device during the movement in one direction of said lever.

13. A button-hole machine comprising a vertically reciprocating and laterally vibrating needle, a work moving mechanism, a tension device for the thread, a tension change device, a mechanism adapted to automatically change the extent of the lateral vibrations of said needle and to simultaneously therewith engage the said tension change device and thereby change the degree of tension produced on the thread by the same, and means for actuating said mechanism said means being separate from the aforesaid work moving mechanism.

14. In combination in a button-hole machine, a work-carrier confined to move longitudinally of a button-hole only, means for operating said work-carrier, mechanism adapted to coöperate with the movement of said work-carrier to make the end and side stitches of a button-hole, a tension device for the thread, and means operated from a moving part of said mechanism for engaging said tension device and releasing the tension of the same from the thread.

15. A sewing machine comprising a stitch forming mechanism for making the side and end stitches of a button-hole, a work moving mechanism comprising a feed wheel, means for controlling said stitch forming mechanism for making the said end and side stitches comprising a toothed wheel the axis of which is coincident with the axis of said feed wheel, a tension device for the thread, means adapting said controlling mechanism to change the degree of tension produced on the thread by said tension device, and means for actuating said toothed wheel separately from the feed wheel.

16. A button-hole machine comprising a tension device for the thread, means for changing the degree of tension produced on the thread by said tension device comprising a cam, a toothed wheel carried by said cam, a gap in the teeth of said toothed wheel, an actuating pawl that beats time in the said gap during the stitching of the sides of the button-hole, and means for bringing the teeth of said wheel into engagement with said actuating pawl.

17. A button-hole machine comprising a tension device for the thread, means for changing the degree of tension produced on the thread by said tension device comprising a cam, a toothed wheel carried by said cam, an actuating pawl for said toothed wheel normally out of engagement with the teeth of the same, means for adjusting angularly the said toothed wheel relative to said cam, and means for bringing the teeth of said toothed wheel into engagement with said actuating pawl.

18. A button-hole machine comprising a vertically reciprocating and laterally vibrating needle, a work moving mechanism, a needle change mechanism, means for operating said needle change mechanism said means being separate from the work moving mechanism, a tension change mechanism, and means for operating said tension change mechanism from the action of said needle change mechanism.

19. A button-hole sewing machine comprising a vertically reciprocating and laterally moving needle, a tension device for the thread, a work-carrier, a revolving mechanism for operating said work-carrier, a second revolving mechanism mounted separately from said work-carrier mechanism, means adapting said second revolving mechanism to increase and decrease the extent of the lateral movement of the needle during one half of the cycle of movement of said mechanism, and means operated from the movement of said second revolving mechanism for changing the tension produced on the thread by the aforesaid tension device.

20. A button-hole machine comprising a tension device for the thread, a work moving mechanism comprising a feed wheel, a tension change mechanism, a revolving part for operating the same, and means for revolving said revolving part at a higher rate of speed than said feed wheel.

21. A button-hole machine comprising a vertically reciprocating and laterally moving needle, a tension device, a tension change device for engaging said tension device, a lever, a connection between said lever and said laterally moving needle, a connection between said lever and said tension change device, and means whereby during the movement of said lever in one direction the extent of the lateral movement of the needle is increased and decreased and the tension change device is actuated to decrease and increase the tension produced on the thread by the tension device.

In testimony whereof I have hereunto set my hand in the presence of two subscribing witnesses.

WILLIAM N. PARKES.

Witnesses:
 EUGENIE P. HENDRICKSON,
 GEO. W. EISENBRAUN.